United States Patent Office 3,419,659
Patented Dec. 31, 1968

3,419,659
SUN SCREENING METHODS
Sigmund C. Catino, Castleton, Albert F. Strobel, Delmar, and Norman Blumenkopf, Brooklyn, N.Y., assignors to GAF Corporation, a corporation of Delaware
No Drawing. Filed July 8, 1964, Ser. No. 381,255
5 Claims. (Cl. 424—60)

ABSTRACT OF THE DISCLOSURE

A composition and process for protecting human skin against the effects of the burning rays of the sun, which composition comprises a compound of the formula:

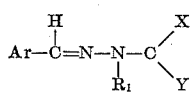

wherein (a) Ar represents a benzene ring devoid of water-solubilzing groups, nitro and more than 2 oxy groups,
(b) $R_1$ is selected from the group consisting of hydrogen and alkyl,
(c) X is selected from the atoms oxygen and sulfur,
(d) Y is selected from the class consisting of alkyl, amino, alkylamino, and $XR_1$;

in a dermatologically acceptable carrier, the compound being employed in an amount effective to protect the skin from the harmful effects of the burning rays of the sun.

---

This invention relates to new and useful sun-screen compounds, to compositons containing such compounds, and to methods for protecting the human skin against the burning, tanning and degradation effects of sunlight, and in particular to cosmetic compositions incorporating the novel compounds of this invention which are outstandingly useful for protecting the skin against sunlight.

Sun-screening compounds in general have been developed whereby they afford quite satisfactory protection against the burning rays of the sun but which would permit the tanning rays to be transmitted. In the approximate range of from about 2,900 to 3,100 A. we find the most detrimental burning wavelengths in the sun's rays. The effect of these wavelengths on the human skin is to produce a severe burning, reddening, blistering and edema which is characteristic of many burns. Obviously, this is not only not desirable from an esthetic point of view, but is a severe detriment to human health. In order, therefore, to overcome this effect of the burning rays of the sun, many compounds have been heretofore employed to screen out these burning rays. Most of these compounds, however, suffer from one or more deficiencies. Among the latter, mention may be made of poor stability when exposed to actinic radiation whereby the protective effect of the compounds is rapidly diminished, and therefore protection to the skin is greatly decreased after short exposure to sunlight. Another deficiency is the ready removal of the material from the skin such as might occur during bathing and the like, and finally, the greatest deficiency lies in the fact that in order to achieve a significant reduction in the transmission of the burning rays of the sun, it is necessary to apply a relatively thick coating containing the absorber, and this in most instances is not feasible.

In order, therefore, to achieve the ends of the present invention, it is not only necessary to provide a composition which has an outstanding filtering action on those rays of the sun from about 2,900 A. to about 3,100 A., but it is further necessary to provide a compositon which exhibits significant stability for several hours when exposed to this high actinic radiation, and finally, it is necessary to provide a composition which will exhibit a decreased tendency to be removed from the skin, such as when bathing and the like.

One of the objects, therefore, of the present invention is to provide outstanding and useful compounds and compositions which have excellent filtering action on the ultraviolet rays of solar light, and particularly those wavelengths of from about 2,900 A. to about 3,100 A.

It is still another object of the present invention to provide compositions, and particularly cosmetic compositions, which may be applied to the human skin to protect it against the rays of the sun.

It is a still further object of the present invention to provide processes for preparing compounds and compositions with which the present invention is concerned and further, to provide processes for protecting the human skin against the burning rays of the sun.

Other objects will appear hereinafter as the description proceeds.

In accordance with the objects of the present invention, it has now been discovered that a class of compounds hereinafter to be described has outstanding screening characteristics for the burning rays of the sun, and particularly those wavelengths in the ultraviolet region of from about 2,900 A. to about 3,100 A., and that such compounds have outstanding K values as well as unexpectedly superior light fastness and stability upon exposure to ultraviolet radiation. The K value is a measure of the efficiency of the compound to filter out specified wavelengths of light. A compound with a K value of 1 is one which, at a concentration of 0.1% in a thickness of 1 cm. reduces the light transmitted to 10% of the incident radiation. Thus, a compound with a K=10 at a given wavelength in a concentration of 0.1% will reduce the transmitted radiation to 10% of the incident radiation wtih a thickness of only 1 mm.

The compounds of the present invention and those which are employed in the compositions and processes of this invention have the following general formula:

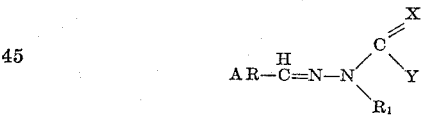

wherein AR represents a benzene ring devoid of water-solubilizing groups such as sulfonic acid and carboxy, $R_1$ may be hydrogen, alkyl, cycloalkyl, cycloalkenyl and substituted derivatives thereof such as hydroxyalkyl, cyanoalkyl, haloalkyl, alkoxyalkyl, carbalkoxyalkyl, hydroxyalkoxyalkyl and the like, X is oxygen or sulfur, and Y is alkyl, amino, substituted amino

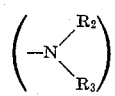

or $XR_1$ wherein $R_1$ is as defined above and $R_2$ and $R_3$ may be $R_1$ or the atoms necessary to complete a hetero ring with the nitrogen atom, e.g., morpholino, pyrryl, piperidino, an azole (5-membered ring-two or more hetero atoms, one of which is nitrogen), or an azine (6-membered ring—two or more hetero atoms, one of which is nitrogen). The benzene ring may contain other substituents such as halogen, lower alkyl ($C_1$ to $C_6$), substituted lower alkyls, oxy (such as lower alkoxy, hydroxy lower alkoxy, lower alkoxy lower alkoxy and the like, and carbalkoxy as well as other non-auxochromic groups which do not have a significant bathochromic effect. By significant we mean a shifting of the absorption of more than about 250 A. A group which is specifically to be avoided is nitro as well as more than two oxy substituents. It is also preferred that the compounds do not contain an amino group in the aryl moiety since in general such compounds have inferior light fastness although it is to be understood that the effectiveness thereof over the broad spectrum of the burning and tanning wavelengths is on a par with the other compounds.

Suitable substituents for $R_1$, $R_2$ and $R_3$ include all of the well known and the general class of alkyls and various substituted form thereof such as: methyl, ethyl, n-propyl, iso-propyl, n-butyl, iso-butyl, tertiary-butyl, secondary-butyl, n-amyl, iso-amyl, tertiary-amyl and the other isomeric amyls, n-hexyl, iso-hexyl and the other isomeric hexyls, n-heptyl, iso-heptyl and the other isomeric heptyls, n-primary nonyl(nonyl-1), nonyl-(2), nonyl-(3), nonyl-(5), 2-methyl-octyl-2, 4-ethyl-heptyl-4, 2-methyl-4-ethyl-hexyl-4, n-primary octyl, octyl-(2)(capryl), 2-methyl-3-ethyl-pentyl-3, 2,2,4-trimethyl-pentyl-4, 2-ethyl-hexyl-1, 3-ethyl-hexyl-3, 2-methyl-heptyl-2, 3-methyl-heptyl-3, 4-methyl-heptyl-4, n-primary, decyl(decyl-1) decyl-4(secondary decyl), 2-ethyl-octyl-3(tertiary decyl), 4-propyl-heptyl-4(tertiary decyl), undecyl-1, (n-primary decyl), undecyl-2(n-secondary decyl), dodecyl-1(n-dodecyl), tridecyl-1(n-tridecyl), tridecyl-7, 3-ethyl-undecyl, tetradecyl-1(n-tetradecyl), pentadecyl-1(n-pentadecyl), pentadecyl-8, hexadecyl(cetyl), heptadecyl-9, octadecyl-1, 2-methyl heptadecyl-2, eicosyl-1, docosyl-1, tricosyl-12, tetracosyl, tricapryl, pentacosyl, hexacosyl, heptacosyl, octacosyl, nonacosyl, myrisyl (30 carbons), cyanoethyl, cyano-n-propyl, cyano-isopropyl, cyano-n-butyl, cyano-isobutyl, cyano-n-amyl, cyano-isoamyl, cyanohexyl, cyanoheptyl, cyano-n-octyl, cyano-nonyl, cyanodecyl, cyanolauryl, cyanostearyl and the like, hydroxyethyl, hydroxy-n-propyl, hydroxy-isopropyl, hydroxy-n-butyl, hydroxy-isobutyl, hydroxy-n-amyl, hydroxy-isoamyl, hydroxy-hexyl, hydroxy-heptyl, hydroxy-nonyl, hydroxy-decyl, hydroxy-lauryl, hydroxy-stearyl and the like, carbomethoxyethyl, carbomethoxypropyl, carbomethoxybutyl, carbomethoxyamyl, carbomethoxyhexyl, carbethoxyethyl, carbethoxypropyl, carbethoxybutyl, etc., carbopropoxyethyl, carbopropoxypropyl, carbopropoxybutyl, etc., carbobutoxyethyl, carbobutoxybutyl, etc., chloroethyl, chloropropyl, (N-propyl, isopropyl), chlorobutyl, (N-butyl, isobutyl, etc.), chloroamyl, chlorohexyl, chlorodecyl, chlorolauryl, and the like, bromoethyl, bromopropyl, (N-propyl, isopropyl), bromobutyl, (N-butyl, isobutyl, etc.), bromoamyl, bromohexyl, bromodecyl, bromolauryl, and the like, methoxyethyl, methoxypropyl, (N-propyl, isopropyl), methoxybutyl (N-butyl, isobutyl, etc.), methoxyamyl, methoxyhexyl, methoxydecyl, methoxylauryl, and the like, ethoxyethyl, ethoxypropyl, (N-propyl, isopropyl), ethoxybutyl (N-butyl, isobutyl, etc.), ethoxyamyl, ethoxyhexyl, ethoxydecyl, ethoxylauryl, and the like, hydroxyethoxyethyl, hydroxyethoxypropyl, hydroxyethoxybutyl, hydroxyethoxyamyl, hydroxypropoxyethyl, hydroxypropoxypropyl, hydroxypropoxybutyl, hydroxypropoxyamyl, hydroxybutoxyethyl, hydroxybutoxypropyl, hydroxybutoxybutyl, hydroxybutoxyamyl, allyl, methallyl, crotyl, butenyl-1, pentenyl-1, γ-isopropyl allyl, 2-methyl-octenyl-6 and the like, cyclopropyl, cyclobutyl, cyclopentyl, cyclohexyl, cyclopentnyl (—2), cyclopentenyl (—3), cyclopentenyl (—4), cyclohexenyl (—2), cyclohexenyl (—3), cyclohexenyl (—4), cyclohexenyl (—5), 2-methyl cyclohexenyl (—4—), 4-chlorocyclohexyl, 4-allyl cyclohexyl, 3-bromocyclohexyl, 2-isopropyl cyclohexyl, 3-n-propyl cyclohexyl, 4(2-chloroethyl) cyclohexyl, 4(2-hydroxyethyl) cyclohexyl, 4-hydroxycyclohexyl, 3-methyl-4-chlorocyclohexyl, 3,4-dibromocyclohexyl, 2,4-dimethylcyclohexyl.

Similar substituents may be present in the benzene ring with the proviso as pointed out above that it is preferred that the carbon chain be no greater than about 6 carbon atoms. Also, as mentioned above, the benzene ring may contain halogen substituents such as chlorine, bromine, iodine and fluorine as well as alkyl sulfonyls such as methyl sulfonyl, ethyl sulfonyl, carboxamido, N-methylcarboxamide, N-ethylcarboxamide, N,N-dimethylcarboxamide, N,N-diethylcarboxamide, sulfonamide, etc.

The general procedure for preparing the compounds used in this invenition involves a condensation of a benzaldehyde with the keto or thioketo hydrazine compound. The condensation may be carried out in any suitable manner, i.e., with or without solvent or diluent, although a solvent is preferred. The methine compounds form readily upon refluxing and removal of water formed during the condensation reaction.

Among suitable aldehydes which may be used in the condensation reaction are:

benzaldehyde,
o-tolualdehyde,
m-tolualdehyde,
p-tolualdehyde,
p-ethyl benzaldehyde,
2,4-dimethyl benzaldehyde,
2,5-dimethyl benzaldehyde,
3,4-dimethyl benzaldehyde,
p-isopropyl benzaldehyde,
2,4,6-trimethyl benzaldehyde,
2,4,5-trimethyl benzaldehyde,
2-chloro benzaldehyde,
3-chloro benzaldehyde,
4-chloro benzaldehyde,
2-bromo benzaldehyde,
3-bromo benzaldehyde,
4-bromo benzaldehyde,
2,4-dichloro benzaldehyde,
2,5-dichloro benzaldehyde,
2,6-dichloro benzaldehyde,
3,4-dichloro benzaldehyde,
2,3,4-trichloro benzaldehyde,
2,3,6-trichloro benzaldehyde,
2,4,5-trichloro benzaldehyde,
2,4,6-trichloro benzaldehyde,
2,3,4,6-tetrachloro benzaldehyde,
pentachloro benzaldehyde,
2,4,6-tribromo benzaldehyde,
2,3,4,5-tetrabromo benzaldehyde,
2-fluorobenzaldehyde
2-bromo-6-chloro benzaldehyde,
2-iodo-benzaldehyde,
3-iodo-benzaldehyde,
4-iodo-benzaldehyde,
4-chloro-3,5-dibromo benzaldehyde,
4-chloro-3-bromo benzaldehyde,
3-chloro-4-bromo benzaldehyde,
4-chloro-3-iodo benzaldehyde,
2,4-dichloro-3,5-dibromo benzaldehyde,
4-chloro-2-methyl benzaldehyde,
4,6-dichloro-3-methyl benzaldehyde,
2-iodo-3-methyl benzaldehyde,
6-chloro-2,4-dimethyl benzaldehyde,
5-chloro-2,4-dimethyl benzaldehyde,
3,5-dichloro-2,4-dimethyl benzaldehyde,
4-bromo-2,5-dimethyl benzaldehyde,
2-allyl-4-allyloxy benzaldehyde,
3-allyl-4-allyloxy benzaldehyde,
3-allyl-2-(2-chloroethoxy) benzaldehyde,
3-allyl-2-(3-chloro-2-hydroxypropoxy) benzaldehyde,
3-allyl-4-hydroxy benzaldehyde,
m-allyloxy benzaldehyde,
o-allyloxy benzaldehyde,
p-allyloxy benzaldehyde,
o-benzyloxy benzaldehyde,
m-benzyloxy benzaldehyde,
p-benzyloxy benzaldehyde,
4-benzyloxy-3-bromo benzaldehyde,
2-benzyloxy-5-chloro benzaldehyde, 4-benzyloxy-3-chloro benzaldehyde,
4-benzyloxy-3,5-dibromo benzaldehyde,
4-benzyloxy-3-iodo benzaldehyde,
4-bromo-3-hydroxy benzaldehyde,
2-bromo-5-ethoxy benzaldehyde,
3-bromo-4-hydroxy benzaldehyde,
o-butoxy benzaldehyde,
m-butoxy benzaldehyde,
p-butoxy benzaldehyde,
p-(2-butenyloxy) benzaldehyde,
p-sec. butyl benzaldehyde,
p-tert. butyl benzaldehyde,
2-butyl-4,6-dimethyl benzaldehyde,
3-tert. butyl-4-ethoxy benzaldehyde,
p-butylsulfonyl benzaldehyde,
6-tert. butyl-2,3,4-trimethyl benzaldehyde,
o-(o-chlorobenzyloxy) benzaldehyde,
m-(o-chlorobenzyloxy) benzaldehyde,
p-(o-chlorobenzyloxy) benzaldehyde,
o-(p-chlorobenzyloxy) benzaldehyde,
m-(p-chlorobenzyloxy) benzaldehyde,
p-(p-chlorobenzyloxy) benzaldehyde,
o-(2-chloroethoxy) benzaldhyde,
p-(2-chloroethoxy) benzaldehyde,
2-chloro-3-hydroxy benzaldehyde,
2-chloro-5-hydroxy benzaldehyde,
2-chloro-4-hydroxy benzaldehyde,
3-chloro-4-hydroxy benzaldehyde,
p-[2-(2-butoxyethoxy)ethoxy] benzaldehyde,
3-chloro-4-hydroxy benzaldehyde,
4-chloro-3-hydroxy benzaldehyde,
o-(3-chloro-2-hydroxypropoxy) benzaldehyde,
p-(3-chloro-2-hydroxypropoxy) benzaldehyde,
o-(2-cyanoethoxy) benzaldehyde,
p-hydroxy benzaldehyde,
m-hydroxy benzaldehyde,
4-sulfamyl benzaldehyde,
6-chloro-4-sulfamyl benzaldehyde,
p-formyl-N,N-bis(2-hydroxyethyl) benzenesulfonamide,
p-formyl-N-methyl benzenesulfonamide,
p-formyl-N-ethyl benzenesulfonamide,
p-formyl-N-octyl benzenesulfonamide,
p-formyl-N-phenethyl benzenesulfonamide,
p-formyl-N,N-dimethyl benzenesulfonamide,
p-formyl-N,N-diethyl benzenesulfonamide,
p-formyl-N,N-dipropyl benzenesulfonamide,
p-formyl-N,N-dioctyl benzenesulfonamide,
3-formyl benzamide,
4-formyl benzamide,
2,6-dichloro-3-formyl benzamide,
2,4-dichloro-3-formyl benzamide,
2,4,6-trichloro-3-formyl benzamide,
4,5,6-trichloro-3-formyl benzamide,
2,5-dichloro-4-formyl benzamide,
2,3,5-trichloro-4-formyl benzamide,
2,3,6-trichloro-4-formyl benzamide,
2-carbomethoxy benzaldehyde,
3-carbomethoxy benzaldehyde,
4-carbomethoxy benzaldehyde,
2-carboethoxy benzaldehyde,
3-carboethoxy benzaldehyde,
4-carboethoxy benzaldehyde,
2-carboisopropoxy benzaldehyde,
3-carboisopropoxy benzaldehyde,
4-carboisopropoxy benzaldehyde,
4-carbo(n)butoxy benzaldehyde,
o-methoxy benzaldehyde,
m-methoxy benzaldehyde,
p-methoxy benzaldehyde,
o-n-propoxy benzaldehyde,
m-n-propoxy benzaldehyde,
p-n-propoxy benzaldehyde,
o-isopropoxy benzaldehyde,
m-isopropoxy benzaldehyde,
p-isopropoxy benzaldehyde,
o-cyclohexyl benzaldehyde,
p-cyclohexyl benzaldehyde,
o-cyclohexyloxy benzaldehyde,
p-cyclohexyloxy benzaldehyde,
o-cyclophentyl benzaldehyde,
p-cyclopentyl benzaldehyde, Examples of specific hydrazines are: acetyl hydrazine, N - acetyl-N-methyl hydrazine, N-acetyl-N-ethyl hydrazine, N - acetyl-N-isopropyl hydrazine, propionyl hydrazine, N-propionyl-N-methyl hydrazine, N-hexanoyl hydrazine, N-hexanoyl-N-methyl hydrazine, stearoyl hydrazine, N-stearoyl-N-ethyl hydrazine, 2-aminothioacetamide, 2-amino-2-methylthioacetamide, 2-amino-2 - ethylthioacetamide, carbazic acid, benzyl ester, carbazic acid, methyl ester, carbazic acid, ethyl ester, carbazic acid, hydroxyethyl ester, cyanoethyl ester, 2-amino-2-(β-hydroxyethyl) thioacetamide, N-acetyl-N-hydroxyethyl hydrazine, N-acetyl-N-chloroethyl hydrazine, carbazic acid, dithioethyl ester,

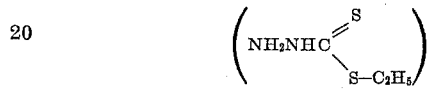

2-methyl carbazic acid, dithiomethyl ester, 2-ethyl semicarbazide,

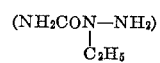

2-methyl semicarbazide, 2-methyl-4-ethyl semicarbazide, morpholino carboxylic hydrazide,

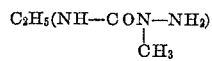

2,4-dimethyl semicarbazide, 2,4-diethyl semicarbazide, 4-methyl - 4 - isobutyl semicarbazide, thiosemicarbazide ($NH_2NHCSNH_2$), 4 - methyl thiosemicarbazide, 2,4-dimethyl thiosemicarbazide.

In the following examples which will serve to illustrate the present invention, parts are by weight unless otherwise indicated.

EXAMPLE 1

0.5 m. of p-chlorobenzaldehyde and 0.5 m. of semicarbazide are refluxed in 200 ml. of anhydrous ethanol in a 500 ml. flash for 1½ hours. The reaction mixture is drowned in 250 ml. of ethanol and cooled to 5° C. The result is a copious precipitate which is filtered. The product has a melting point of 224.4°–225.2° C. and a $K_{max} = 133$ at 298 mμ.

EXAMPLE 2

Example 1 is repeated employing o-chlorobenzaldehyde in place of the paraisomer. The resultant condensation product has a melting point of 241.0°–241.8° C. and a $K_{max}$ at 287 mμ.

EXAMPLE 3

Examples 1 and 2 are again repeated substituting thiosemicarbazide for semicarbazide. The resultant condensation products have the following characteristics:

|  | Melting point° C. | $K_{max}$ |
| --- | --- | --- |
| o-Chloro isomer | 205.8–206.6 |  |
| p-Chloro isomer | 200.2–201.6 | 130 at 323 mμ |

EXAMPLE 4

Example 3 is repeated employing p-acetaminobenzaldehyde. The resultant thiosemicarbazone has a $K_{max}$ at 312 mμ.

EXAMPLE 5

Example 1 is repeated employing the following aldehydes: (a) benzaldehyde, (b) p-tolualdehyde, (c) 3,4-dimethyl benzaldehyde, (d) 2,4-dichloro benzaldehyde, (e) 3-iodobenzaldehyde, (f) 4-chloro-2-methyl benzaldehyde, (g) *o*-allyloxy benzaldehyde, (h) *p*-benzyloxy benzaldehyde, (i) 2-bromo-5-ethoxy benzaldehyde, (j) *p*-butylsulfonyl benzaldehyde, (k) *p*(2-chloroethoxy) benzaldehyde, (l) *o*(2-cyanoethoxy) benzaldehyde, (m) *p*-cyclopentyl benzaldehyde, (n) *p*-aminobenzaldehyde, (o) *p*-acetaminobenzaldehyde, (p) *p*-cyclohexyloxy benzaldehyde.

Compounds 5–*n* and 5–*o*, while excellent absorbers, are less light stable than the other nonamino compounds. This is true, also, of the compound of Example 4.

EXAMPLE 6

Example 1 is repeated using the following hydrazine compounds: (a) acetyl hydrazine, (b) 2-methyl semicarbazide, (c) 2-ethyl semicarbazide, (d) 2-methyl thiosemicarbazide, (e) 2,4-dimethyl thiosemicarbazide.

The compounds 6–*b* through 6–*c* are particularly outstanding in that they exhibit an unexpectedly superior light stability along with outstanding screening action on ultra-violet radiation.

EXAMPLE 7

2-methyl thiosemicarbazide is condensed with the following aldehydes as in Example 1: (a) benzaldehyde, (b) *m*-tolualdehyde, (c) *p*-ethyl benzaldehyde, (d) 2,5-dichloro benzaldehyde, (e) 2-allyl-4-allyloxy benzaldehyde, (f) *p*-isopropoxy benzaldehyde.

The resultant compounds are outstanding screening agents for ultra-violet radiation as well as exhibiting exceptional stability while exposed to such radiation.

EXAMPLE 8

Example 1 is further repeated using the following hydrazine compounds: (a) 2-methyl acetyl hydrazine, (b) stearoyl hydrazine, (c) 2-amino acetamide, (d) 2-amino-2-ethyl acetamide, (e) N-acetyl-N-hydroxy ethyl hydrazine, (f) 2-amino-2-methyl thioacetamide, (g) carbazic acid, benzyl ester, (h) 4-methyl-4-isobutyl semicarbazide, (i) 2,4-dimethyl semicarbazide, (j) 4-methyl thiosemicarbazide, (k) 4,4-dimethyl semicarbazide, (l) 4,4-dimethyl thiosemicarbazide, (m) 2-methyl-4,4-dimethyl semicarbazide, (n) 2-methyl-4,5-dimethyl thiosemicarbazide, (o) morpholine carboxylic hydrazide, (p) 4-hydroxyethyl thiosemicarbazide, (q) 4-mercaptoethyl semicarbazide.

EXAMPLE 9

The compounds of Examples 1, 3 and 4 are made up, separately, as 1% dispersions (by weight based on the weight of the composition) in medicinal mineral oil and applied to the skin. After 5 hours exposure to afternoon, summer sun, the oil film is washed off and, in each instance, there is no evidence of erythema.

The dispersions in Example 9 are prepared by first making a dispersed form of the compounds by milling them with the sodium salt of a sulfonated naphthalene-formaldehyde condensate (Blancol N—General Aniline & Film Corp.) to yield a 50% disperson (1 part absorber to 1 part dispersing agent). This dispersed composition is added with stirring to hot mineral oil to produce an excellent dispersion of the absorber in the oil.

EXAMPLE 10

Example 9 is repeated using concentrations of 2%, 5% and 10%.

EXAMPLE 11

The compounds of Examples 1, 3 and 4 are separately made up as aerosol formulations of the following compositions:

| | Parts |
|---|---|
| Absorber | 2 |
| Ethanol | 70 |
| Polyvinyl pyrrolidone (K=30) | 1 |
| Propellant (Freon mixture of 3 parts 12 and 1 part 12) | 40 |

Sprayed upon the skin results in an excellent film which gives excellent protection.

EXAMPLE 12

1 part of the absorber of Example 1 is dissolved in 10 parts of polyethylene glycol (M.W. 3,000) and this combination is then dissolved in 89 parts of cottonseed oil. An excellent oil base sun-screen composition results.

EXAMPLE 13

A mixture of 6 parts mineral oil and 7 parts stearic acid is heated to 75° C. and add, with stirring, to a heated (75° C.) mixture of 70 parts water, 3 parts glycerin and 2.5 parts triethanolamine, 2 parts sodium alginate. To the resultant emulsion, there is added, while hot (65° C.) 2.5 parts of the compound of Example 1 dissolved in 7.0 parts coconut oil. An excellent, smooth lotion results.

EXAMPLE 14

The compounds of Examples 1 and 2 are incorporated, separately, into a cosmetic cream at 2% (by weight) concentration. The cream is composed of:

| | Parts |
|---|---|
| Petrolatum | 9 |
| Mineral oil | 4 |
| Water | 62 |
| Glyceryl monostearate | 6 |
| Beeswax | 3.5 |
| Polyvinylpyrrolidone (K=30) | 2.0 |

In the above examples, there have been illustrated the preparation of numerous compounds coming within the scope of the present invention as well as exemplifications of the use of many of them as ultra-violet absorbers, and particularly as sun-screen agents. As described, the compounds may be applied to the skin as dispersions in suitable carriers which may be water-immiscible or insoluble, such as mineral oil, or as solutions in alcohol or any other suitable liquid which may or may not require a co-solvent to effect the solution thereof, or as a dispersion in an aqueous medium which may be an emulsion of the oil-in-water or water-in-type. Illustrations have been given showing the use of various additives which are conventional in such cosmetic preparations which are to be applied to the skin, and it is to be understood that any other conventional additives normally used for topical applications may be incorporated in the compositions containing the absorbers herein described. Again, as illustrated, various concentrations from 1 to 10% of absorber have been shown but again, such concentrations are not critical. For most applications and from practical considerations based upon the efficacy of these sun-screen agents and economics of the resultant composition, amounts of from about 0.1% by weight to about 10% by weight may be used, and most preferably from about 0.5% to about 5% by weight based on the weight of the total composition to be topically applied. It is also possible to employ the ultra-violet absorbers herein disclosed in their 100% active form where so desired. Since the absorption characteristics of the various compounds herein disclosed vary and are obviously not all identical, it may be desired to employ mixtures of two or more compounds in order to obtain specifically attainable absorption performance. Still further, other well known absorbers may also be used in combination with those herein described.

Other variations in and modifications of the described processes which will be obvious to those skilled in the art can be made in this invention without departing from the scope or spirit thereof.

We claim:

1. A method for protecting human skin against the burning rays of actinic radiation which comprises applying to the skin a composition comprising:

(I) a compound of the formula

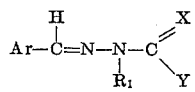

wherein (a) Ar represents benzene or substituted benzene wherein the substituents are selected from the group consisting of halogen, hydroxy, lower alkyl, allyl, cyclopentyl, cyclohexyl, lower alkoxy, hydroxy lower alkoxy, lower alkoxy lower alkoxy, carbalkoxy of up to 6 carbon atoms, allyloxy, 2-chloroethoxy, 2-cyanoethoxy, cyclohexyloxy, benzyloxy, chlorobenzyloxy, sulfamyl, sulfonamido, carboxamido, N-methyl carboxamido, N-ethyl carboxamido, N,N-dimethyl carboxamido, N,N-diethylcarboxamido, methyl sulfonyl, ethyl sulfonyl and bltyl sulfonyl, provided that when the substituents are oxy groups there are no more than two such groups;
(b) $R_1$ is selected from the group consisting of hydrogen and alkyl;
(c) X is selected from the group consisting of oxygen and sulfur;
(d) Y is selected from the group consisting of alkyl, amino, alkylamino and $XR_1$; and
(II) a dermatologically acceptable carrier; said compound being present in an amount effective to protect human skin from the burning rays of the sun.

2. A method for protecting human skin against the burning rays of actinic radiation which comprises applying to the skin a composition comprising:

(I) a compound of the formula

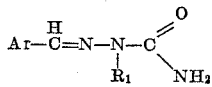

wherein (a) Ar is as defined in claim 1;
(b) $R_1$ is selected from the group consisting of hydrogen and alkyl; and
(II) a dermatologically acceptable carrier; said compound being present in an amount effective to protect human skin from the burning rays of the sun.

3. A method for protecting human skin against the burning rays of actinic radiation which comprises applying to the skin a composition comprising:

(I) a compound of the formula

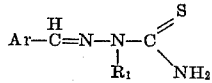

wherein (a) Ar is as defined in claim 1;
(b) $R_1$ is selected from the group consisting of hydrogen and alkyl; and (II) a dermatologically acceptable carrier; said compound being present in an amount effective to protect human skin from the burning rays of the sun.

4. A method for protecting human skin against the burning rays of actinic radiation which comprises applying to the skin a composition comprising:

(I) a compound of the formula:

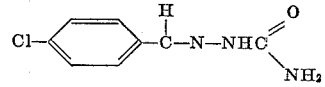

and (II) a dermatologically acceptable carrier; said compound being present in an amount effective to protect human skin from the burning rays of the sun.

5. A method for protecting human skin against the burning rays of actinic radiation which comprises applying to the skin a composition comprising:

(I) a compound of the formula

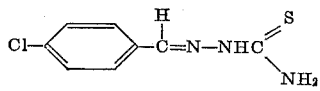

and (II) a dermatologically acceptable carrier; said compound being present in an amount effective to protect human skin from the burning rays of the sun.

References Cited

UNITED STATES PATENTS

| | | | |
|---|---|---|---|
| 2,261,735 | 11/1941 | Gertler et al. | 260—554 X |
| 2,353,690 | 7/1944 | Clarkson et al. | 260—554 X |
| 2,322,184 | 6/1943 | White | 260—554 X |
| 2,668,178 | 2/1954 | Behnisch et al. | 260—470 X |
| 2,672,463 | 3/1954 | Huebner | 260—510 X |
| 2,749,270 | 6/1956 | Garber | 260—554 X |
| 3,153,089 | 10/1964 | Ameen | 260—554 X |
| 3,182,082 | 5/1965 | Sydor | 260—554 X |
| 3,314,914 | 4/1967 | Suling et al. | 260—45.9 X |

FOREIGN PATENTS

| | | |
|---|---|---|
| 217,449 | 10/1961 | Austria. |
| 677,253 | 8/1952 | Great Britain. |
| 727,870 | 4/1955 | Great Britain. |
| 962,524 | 4/1957 | Germany. |

OTHER REFERENCES

Sandstrom, Acta Chemica Scandinavia, vol. 17, No. 4 (1963), pp. 937–946.

ALBERT T. MEYERS, *Primary Examiner.*

V. C. CLARKE, *Assistant Examiner.*

U.S. Cl. X.R.

260—455, 471, 551, 552, 554, 562